United States Patent [19]

Stone

[11] 3,964,242

[45] June 22, 1976

[54] COTTON HARVESTING MACHINE

[75] Inventor: G. W. (Charles) Stone, Dyess, Ark.

[73] Assignee: Agriculture Research Incorporated, Williamsburg, Va.

[22] Filed: May 28, 1975

[21] Appl. No.: 581,696

[52] U.S. Cl. .................................. 56/30; 56/13.3
[51] Int. Cl.² ........................................ A01D 46/10
[58] Field of Search ............... 56/28, 30, 12.8–13.3, 56/13.5, 44

[56] References Cited
UNITED STATES PATENTS

| | | | |
|---|---|---|---|
| 1,731,826 | 10/1929 | Morara | 56/44 |
| 2,140,399 | 12/1938 | Connolly | 56/30 |
| 2,175,216 | 10/1939 | Rust | 56/13.1 |
| 2,241,423 | 5/1941 | Rust | 56/13.2 |
| 2,660,848 | 12/1953 | Rust | 56/30 |
| 2,763,978 | 9/1956 | Graham et al. | 56/30 |
| 3,332,220 | 7/1967 | Lofgreen | 56/30 |

*Primary Examiner*—Russell R. Kinsey
*Attorney, Agent, or Firm*—Littlepage, Quaintance, Murphy & Dobyns

[57] ABSTRACT

An apparatus adapted to be used in conjunction with a conventional cotton harvester for gleaning cotton missed by the harvester consists of a pair of independently suspended, parallel, opposed intake manifolds. Each manifold comprises a floor member having frontward and rearward end wall members fixed at opposite ends of the floor member. An outside wall is fixed to an outside edge of the floor member and extends from the frontward end wall to the rearward end wall. An inside wall having a height significantly less than the outside wall is fixed to the floor member parallel to, but some distance from, the running edge of the floor member. A downfall sheet is fixed to a top edge of the outside wall and to the inside wall so as to be spaced from and inclined with respect to the floor member. The inside wall contains a plurality of apertures leading to forwardly- and upwardly-inclined ducts leading to the flue comprising the inside of the manifold. Appropriate conduits, blowers, etc. can be connected to each intake manifold via an opening in the rearward end wall of the manifold. Cotton collected by the intake manifolds is pneumatically and mechanically transferred to a header portion of the cotton harvester for further treatment in a conventional manner.

15 Claims, 8 Drawing Figures

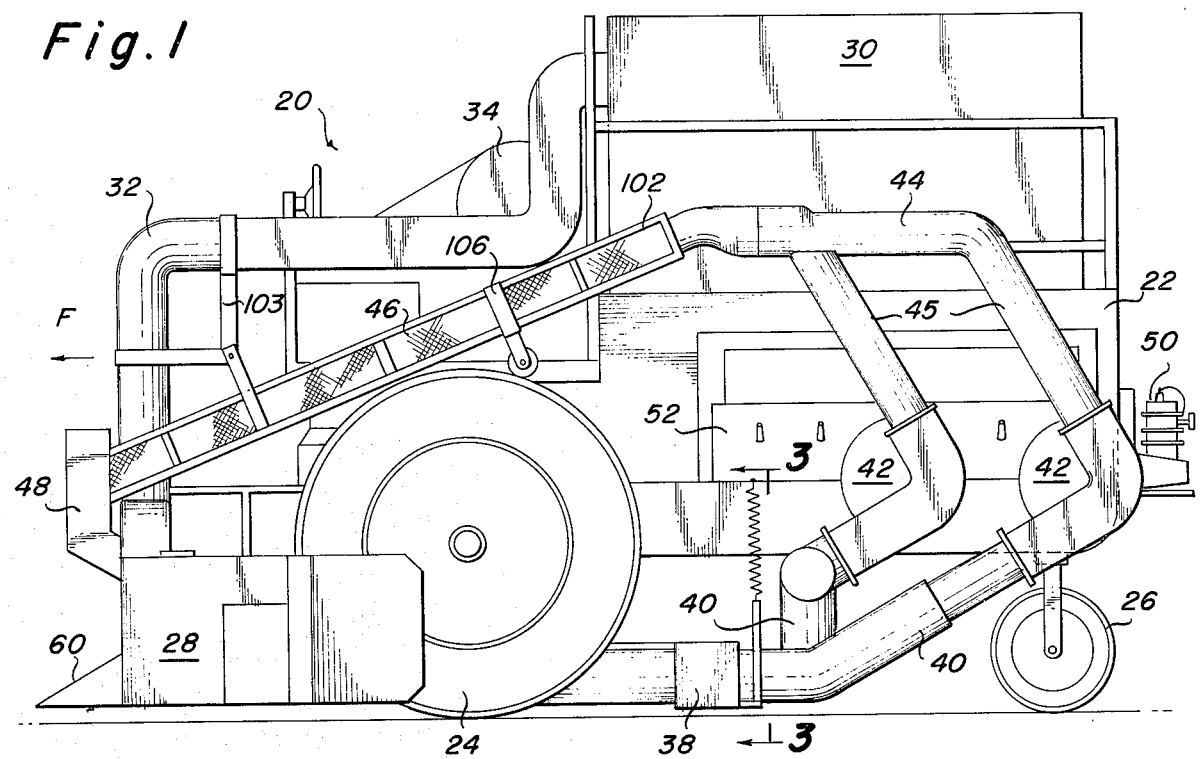
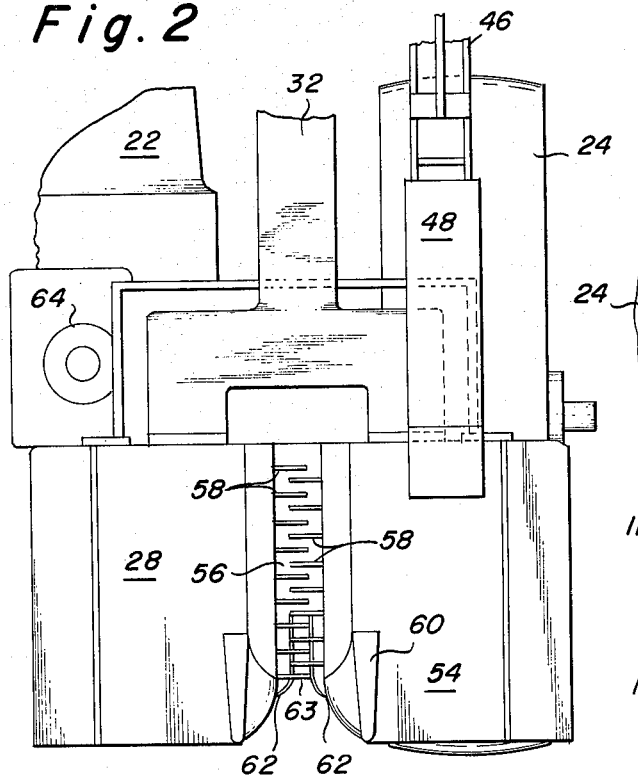
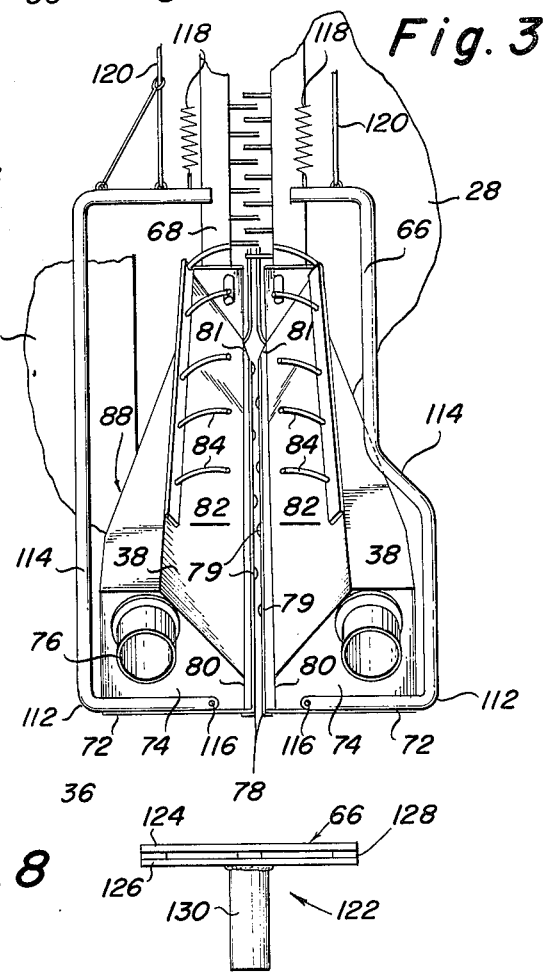

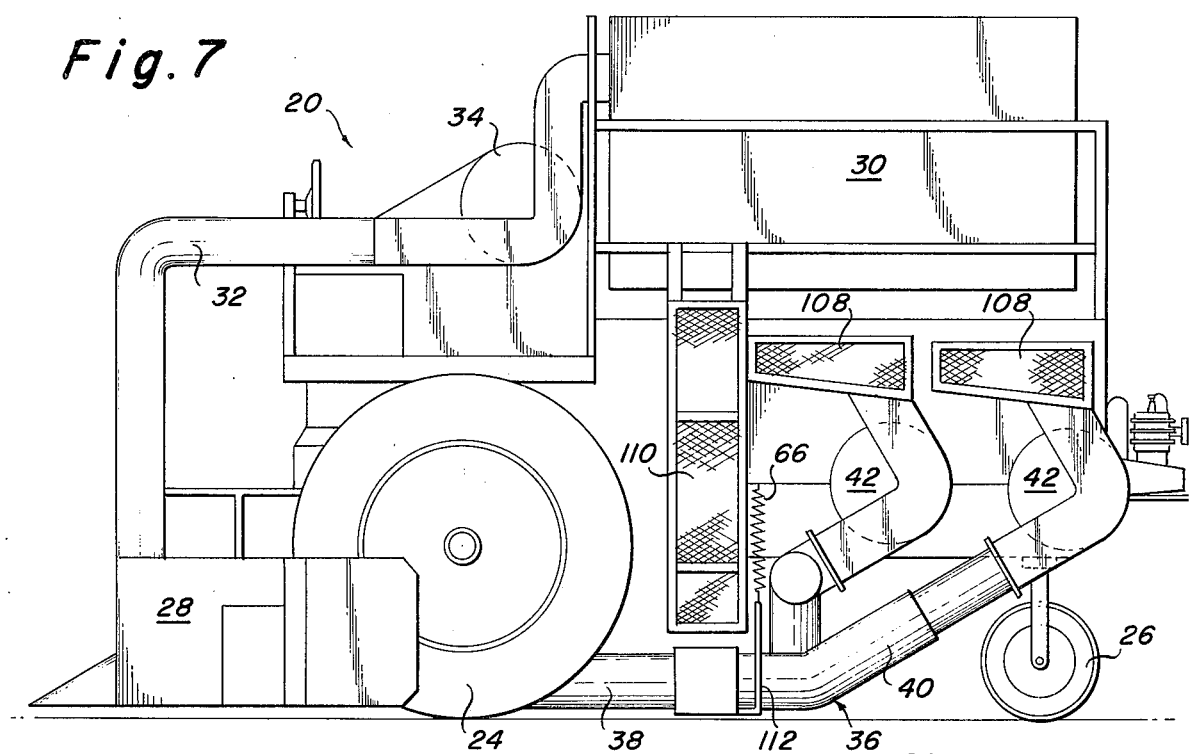
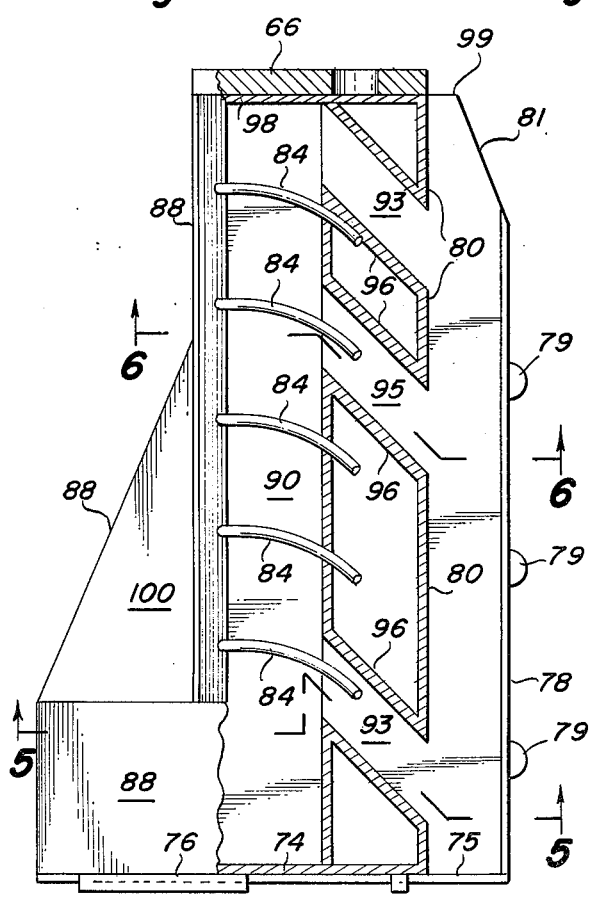
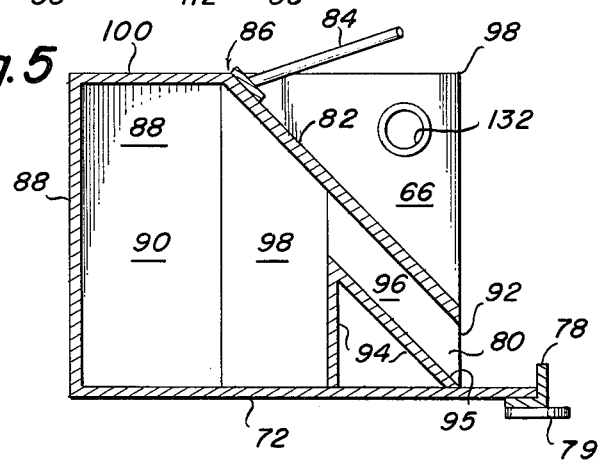
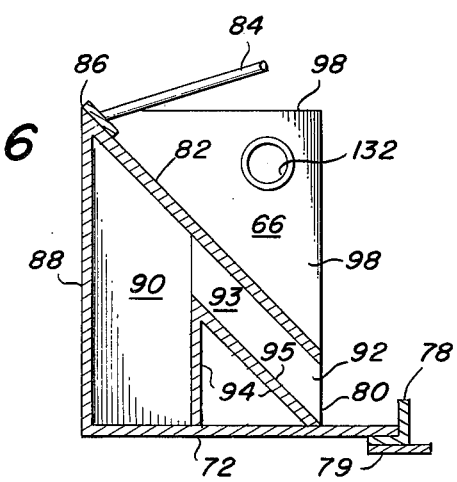

COTTON HARVESTING MACHINE

BACKGROUND OF THE INVENTION

1. Field of the Invention

This invention pertains generally to pneumatic cotton harvesters, and particularly to an apparatus of that type used in combination with a rotary or oscillating spindle type cotton picker.

2. Description of the Prior Art

The use of modern mechanized harvesting equipment for harvesting cotton results in valuable quantities of cotton being scattered on the ground and intermixed with leaves, grass, weeds and dirt. Reportedly as much as 20% of a cotton crop is commonly lost in this manner following the passage of the mechanical harvesting equipment.

Various proposals have been made for recovering this fallen cotton, but all are found subject to serious disadvantages and shortcomings sought to be avoided by the present invention. Examples of prior art devices using at least in part pneumatic means for recovering the cotton are to be found in U.S. Pat. Nos. 2,674,078, 3,308,581, 3,327,459, 3,332,220 and 3,416,296.

The recovery of the cotton is complicated by various factors including the fact that cotton is light and its fibers very easily become entangled with other portions of the cotton plant and with other plants. This is particularly serious as respect to leaves and other foreign material of a dry nature which remains attached to the cotton.

To be effective, therefore, it is important, therefore, that the recovery equipment be so designed as to be capable of recovering cotton with a minimum quantity of dirt, leaves, and other debris with which it may be initially engaged. Further, that portion of the debris and foreign matter entering the apparatus must then be separated and ejected from the apparatus without risk of losing the recovered cotton.

The equipment heretofore proposed for the purpose just referred to has been quite unsatisfactory and subject to serious shortcomings, including ineffectiveness in recovering cotton and incapability to clean and separate foreign matter to acceptable minimum standards. As a consequence, the recovered cotton carries highly objectionable quantities of foreign matter with it and this causes serious damage to ginning equipment through which all cotton is passed when first received from the grower.

Much of the prior art is centered at retrieving cotton which has already fallen on the ground. Most schemes of this type incorporate an unsatisfactorily large amount of foreign matter in the recovery process rendering the cotton unacceptable for further use. It is therefore an object of this invention to recover cotton which would normally fall on the ground as the mechanical harvesting equipment is passing through the field before the cotton has a chance to actually hit the ground. A further object of the invention is to provide means for separating out leaves, stalks, rocks, dirt clods, and other debris while retaining only substantially clean cotton.

Another object of the invention is to provide means by which the cotton which would otherwise have been lost will be retrieved and transferred to the picking and cleaning mechanisms included as usual standard features in a cotton harvester. During the transfer process, a second cleaning function is included to further eliminate dried leaves, stems, and other trash from the valuable cotton.

It is well recognized that while rotating or oscillating spindle-type harvesters are able to successfully pick a major portion of the cotton from the cotton plant, some of the cotton is loosened but not removed from the plant. As the plant then leaves the picker header of the harvesting machine, the previously unremoved cotton is dislodged and falls to the ground. It is therefore an object of this invention to position a means for gleaning this cotton immediately behind the cotton picker header and provide the gleaning means with means for agitating the stalks and branches of the cotton plants to complete the dislodging and removing of this cotton from the cotton plant. The dislodged cotton is captured before it has an opportunity to hit the ground, thus preventing the quality degradation of the cotton experienced by so many prior art devices of this type.

SUMMARY OF THE INVENTION

An apparatus adapted to be used in conjunction with a conventional cotton harvester for gleaning cotton missed by the harvester consists of a pair of independently suspended, parallel, opposed intake manifolds. The manifolds are suspended immediately behind the cotton picker header, one on each side of the plant exit slot of the header. The cotton plant upon exitting from the cotton picker header travels between the two intake manifolds and is subjected to violent shaking of the stalk and branches to encourage the complete dislodging of any remaining cotton on the plant. The dislodged cotton falls to a generally V-shaped trough formed by the two manifolds, one on each side of the cotton plant. The cotton gravitates to the lowest portion of the V and is pneumatically swept through ducts to the interior of the manifold and then pneumatically and mechanically is transferred back to the picker header portion of the cotton harvester for treatment in a conventional manner. Each manifold of the gleaner comprises a floor member having a frontward and rearward end wall members fixed at opposite ends thereof. An outside wall is fixed to an outside edge of the floor member and extends from the frontward end wall to the rearward end wall. An inside wall having a height significantly less than the outside wall is fixed to the floor member parallel to, but some distance from, the running edge of the floor member. The running edge of the floor member is that edge immediately adjacent to the stalk of the cotton plant as it passes between the two manifolds. A downfall sheet is fixed to a top edge of the outside wall and to the inside wall so as to be spaced from and inclined with respect to floor member, the downfall sheets of the pair of manifolds thus forming a generally V-shaped trough. The inside wall contains a plurality of apertures leading to forwardly and upwardly inclined ducts leading to the flue comprising the inside of the manifold. Appropriate conduits, blowers, etc. can be connected to each intake manifold via an opening in the rearend wall of the manifold. The cotton gleaning apparatus further consists of blower means mounted on the cotton harvester and flexible conduits attached to the openings in the rearward end walls of each manifold and to the blower for withdrawing the cotton collected by the intake manifolds. The cotton is then directed through a conveyor means attached to the blower means for conveying the cotton collected to the cotton picker header of the cotton harvester. The conveyor means preferably includes a debris eliminator comprising a longitudinal open framework, mounting means pivotally mounting the open framework with respect to the cotton harvester, wire screening or the like fixed to the longitudinal open framework to define a passageway through which the cotton can flow, and a vibrating means fixed to the longitudinal framework for vibrating the debris eliminator. The cotton, with a significant portion of the unwanted debris eliminated is then returned to the header portion of the cotton harvester for further treatment in a conventional manner.

The cotton picker header portion of the harvesting machine is preferably equipped with a plant lifter for raising the low branches of the cotton plant into picking position so that the cotton contained on the low branches is not lost. Further, shield members defining a floor inside the header portion of the cotton harvester should be present to preclude cotton falling to the ground while the cotton plant is inside the header portion of the harvesting machine. The shield members preferably continue throughout the length of the header and extend beyond the rear surface of the header and overlap a portion of the floor member of the two intake manifolds so as to direct cotton to a position to be pneumatically retrieved by the cotton gleaner.

An apparatus incorporating the features of this invention was operated in conjunction with an International Harvester Model 114A during the fall of 1974. The cotton gleaned by this apparatus was retained in a separate receptacle from that cotton picked by the cotton picker header, and amounted to 77 pounds of seed cotton per acre. This resulted in approximately 30 pounds of lint cotton per acre being recovered which otherwise would have been lost. At the prevailing market prices during the fall of 1974, this represents an additional $12.90 per acre yield. This increased yield was experienced with no measurable increase in fuel consumption for operation of the cotton harvesting machine.

BRIEF DESCRIPTION OF THE DRAWINGS

FIG. 1 is a side elevation view of a cotton harvesting machine incorporating a cotton gleaner according to this invention.

FIG. 2 is a front elevation view of the apparatus shown in FIG. 1.

FIG. 3 is a perspective view of the cotton harvesting machine including the cotton gleaner shown in FIG. 1 as viewed from line 3—3.

FIG. 4 is a partial sectional detail of one intake manifold of a cotton gleaner according to this invention.

FIG. 5 is a sectional view of the manifold shown in FIG. 4 taken along line 5—5.

FIG. 6 is another sectional view of the intake manifold shown in FIG. 4 taken along line 6—6.

FIG. 7 is a side elevation view of a cotton harvesting machine incorporating a cotton gleaner according to this invention and including certain variations to maintain the gleaned cotton separate from the cotton picked by the cotton picker header.

FIG. 8 is a plan view of the front suspension means for an apparatus according to this invention.

DESCRIPTION OF THE PREFERRED EMBODIMENTS

A conventional cotton harvester incorporating the improvements of this invention is shown generally in FIG. 1 as 20. The cotton harvester 20 can comprise a self-contained mobile apparatus specifically designed for the function of picking cotton, or can be as illustrated a tractor 22 having traction wheels 24, and steerable wheel 26 with a cotton picker header mounted thereon. The cotton picker header 28 precedes the tractor 22 down rows of cotton plants in the direction indicated by the arrow F. Cotton picked by the header 28 is delivered from the header to a receptacle 30 by a conveyor tube 32 and blower 34. The receptacle or basket 30 is periodically emptied during the picking process, the cotton being then transported to another location for further processing, ginning, and the like.

The cotton harvester 20 illustrated in FIG. 1 incorporates a cotton gleaner 36 according to this invention. The gleaner 36 comprises intake manifolds 38 which immediately follow the cotton picker header 28 to glean cotton missed by the picker header. Attached to the intake manifolds 38 are flexible conduits 40 and blower means 42 for withdrawing the cotton collected by the intake manifolds 38. The cotton is directed from the blower means 42 to a conveying means 44 for conveying the cotton collected to the cotton picker header 28 of the cotton harvester 20. The conveyor means 44 comprises tubes 45 attached to the blowers 42, a debris eliminator 46 and a front delivery chute 48.

The debris eliminator 46 comprises an open longitudinal framework 102, a mounting means 103 for pivotally mounting the open framework with respect to the cotton harvester 20. Fixed to the longitudinal open framework is wire screening 104, defining a passageway through which the cotton will flow and a vibrating means 106 for vibrating the debris eliminator. The angular vibration of the debris eliminator by the vibrating means 106 provides the necessary forward motion on the cotton sought to be retained to permit the cotton to travel from tubes 45 to the front delivery chute 48. The vibrational motion together with the openings presented in the wire screening 104 tends to sift out dirt, dry leaves, small twigs and other trash as the cotton travels through the debris eliminator 46 toward the header 28. The blower means 42 of the gleaner can be powered by auxiliary power means 50, by direct connection to the motor 52 of the tractor 22, or by connection to blower 34. While there are a pair of blower means 42 illustrated, it will be appreciated by those of ordinary skill in the art that only one blower means 42 need be employed.

The cotton picker header 28, shown from the front in FIG. 2, includes a front end 54 having a plant entrance slot 56 into which the cotton plants are directed during the harvesting process. Picking spindles 58 project into the cotton plant in a manner well known in the art to pick and retrieve the ripe cotton from the cotton plant. The header 28 includes a plant lifter 60 which directs the low-hanging branches of the cotton plant to a higher angle so as to permit more thorough cleaning by the picking spindles. Further, shield members 62 extend horizontally from the bottom of the header into the plant entrance slot of the header and define a floor below which cotton missed by the picking spindles 58 will not fall. The narrow opening 63 between the shield members 62 is sufficient to receive the stocks of the cotton plant. Preferably, the shield members are in some manner resiliently deflectable to permit variation in the cotton plant stock size or slight non-alignment in plant location. The cotton picker header 28, when mounted on a tractor as shown in FIG. 1 is generally powered by power takeoff means not shown.

The rear surface 68 of the header 28 is shown in FIG. 3 and includes the plant exit slot 70 from which plants having entered the plant entrance slot 56 will exit. The shield members 62 continue from the front end 54 of the header 28 through the header to the rear surface 68.

The cotton gleaner 36 according to this invention is shown mounted to the rear surface 68 of the cotton picker header 28 by suspension means 66. The cotton gleaner 36 comprises a pair of intake manifolds 38. The two intake manifolds 38 of the cotton gleaner 36 are situated in a parallel, opposed relationship. Each intake manifold 38 comprises generally a floor member 72 having a rearward end wall 74 fixed thereto. The rearward end wall 74 includes an opening 76 through which cotton having been collected by the intake manifolds can be withdrawn. The running edges 78 of the manifolds are in spaced adjacent relationship and tapered on both leading edges 81 such that a cotton plant exiting from the plant exit slot 70 of the picker header 28 must continue between the running edges of the intake manifolds. A plurality of protruberances 79 project from the running edges into the space therebetween so as to vibrate and to shake the stalk of the cotton plant. Rod-like members 84 project into the lower branches of a cotton plant passing therethrough enhancing the shaking and vibrating motion enduced by the protruberances 79. Thus, any cotton which has been incompletely dislodged by the picking spindles 58 of the cotton picker header 28 falls from the cotton plant onto the downfall surfaces or sheets 82 of the cotton gleaner 36. The downfall sheets form a generally V-shaped trough, thus directing cotton which has fallen from the cotton plant toward the bottom of the V-shaped trough. A short inside wall 80 having a height significantly less than the tall outside wall 88 is fixed to the floor member 72 parallel to but some distance from the running edge 78. Cotton falling on the downfall sheets 82 is gravitationally directed to that portion of the floor member 72 between the running edge 78 and angle member 82 and the inside wall 80. the angle member 83 assists in preventing the cotton from ever hitting the ground.

As shown most advantageously in FIGS. 4, 5 and 6, the inside wall 80 has a plurality of apertures 92 leading to ducts 93 which are forwardly and upwardly inclined and lead to a flue 90 inside the intake manifolds 38. Cotton having been directed to the bottom of the V-shaped trough is then pneumatically transported through the upwardly and forwardly inclined ducts 93 to the flue 90 and is then withdrawn from the intake manifold through opening 76 in the rearward end wall 74.

The ducts 93 are defined by the downfall sheet 82, a riser floor 95 fixed to the floor member 72 and extending parallel to the downfall sheet 82, and two parallel, spaced-apart riser side walls 96 on each side of the duct 93 extending from the riser floor 95 to the downfall sheet 82. The riser 94 additionally defines the inside wall of the flue 90 together with the forward end wall 98, and the top member 100.

A cotton harvester 20 shown in FIG. 7 and including the improved gleaner 36 according to this invention was modified to maintain the cotton collected by the gleaner 36 separate from the cotton collected by the cotton picker header 28. The cotton collected by the picker header was directed through conveyor tube 32 by blower 34 to the receptacle 30 while cotton gleaned by the cotton gleaner 36 was withdrawn from the intake manifolds 38 through flexible conduits 40 by blower means 42 and directed through chutes 108 to a receiving basket 110. Each intake manifold 38 of the gleaner 36 comprised a floor member 72, as illustrated in FIGS. 4, 5 and 6. The intake manifold 38 further comprised a frontward end wall 98 and a rearward end wall 74 fixed to opposite ends of the floor member 72. An outside wall 88 was fixed to an outside edge 77 of the floor member 72 and to the frontward and rearward end walls 98 and 74, respectively. An inside wall 80 having a height significantly less than the outside wall 88 was fixed to the floor member 72 parallel to, but some distance from, the running edge 78 of the floor member 72. The running edge 78 includes an angle member 83 secured to the floor member 72 and extending above the floor member to retain cotton between the running edge and the inside wall 80. A downfall sheet 82 was fixed to the top edge 86 of the outside wall 88, the frontward and rearward end walls 98 and 74, respectively, and the inside wall 80 so as to be spaced from and inclined with respect to the floor member 72. The inside wall 80 further comprised a plurality of apertures 92, each aperture 92 opening into a forwardly and upwardly inclined duct 93.

The cotton harvester including the improvements of this invention and operated in conjunction with a cotton picker header 28 made by International Harvester, carrying Model No. 114A, S.N. 1386, successfully recovered an additional 77 pounds of seed cotton per acre during the fall of 1974. The basket 110 together with chutes 108 retained this cotton separate from the cotton ordinarily picked by a header 28 of this type. This 77 pounds of cotton per acre, if sold at the prevailing market prices in the fall of 1974, would have resulted in an increased yield of $12.90 per acre.

The intake manifolds 38 of the apparatus includes suspension means 66 for suspending the gleaner immediately behind the header 28. The rear suspension means 112 shown best in FIG. 3 comprises a rod-like member 114 pivotally mounted to the intake manifold by pivot means 116 and to the tractor 22 by springs 118 and guide wires 120. The forward suspension means 122 shown in FIG. 8 comprises a plate 124 which is fixed to the rear surface 68 of the cotton picker header 28, a plate 126 hingedly attached to plate 124 by hinge means 128. Projecting normally from plate 126 is rod member 130 which is adapted to be received into the aperture 132 of the frontward end wall 98 shown in FIGS. 5 and 6. In this manner, the intake manifold 38 is both hingedly and pivotally suspended from the rear surface 68 of the cotton picker header 28 and from the tractor 22.

Although the invention has been described in considerable detail with reference to figures illustrating certain perferred embodiments thereof, it will be understood that variations and modifications can be effected within the spirit and scope of the invention described above and is defined in the appended claims.

I claim:

1. An intake manifold for an apparatus for gleaning cotton comprising:
   a floor member,
   a frontward end wall and a rearward end wall fixed to opposite ends of the floor member, an outside wall fixed to an outside edge of the floor member and to the frontward and rearward end walls, an inside wall having a height significantly less than the outside wall, the inside wall fixed to the floor member parallel to, but some distance from, a running edge of the floor member, a downfall sheet fixed to a top edge of the outside wall, the frontward and rearward end walls, and the inside wall so as to be spaced from and inclined with respect to the floor member, the inside wall further comprising a plurality of apertures, each aperture opening into a forwardly- and upwardly-inclined duct.

2. The intake manifold of claim 1 wherein the floor member further comprises a plurality of protuberances spaced along the running edge of the floor member.

3. The intake manifold of claim 1 wherein the rearward end wall further comprises an opening for discharging cotton collected by the intake manifold.

4. The intake manifold of claim 1 further comprising suspension means attached to the frontward and rearward end walls for suspending the intake manifold behind a cotton harvester.

5. The intake manifold of claim 1 further comprising a plurality of rod-like members fixed to the top edge of the outside wall and extending over the downfall sheet.

6. The intake manifold of claim 1 wherein said ducts are defined by the downfall sheet, a riser floor fixed to said floor member parallel to the downfall sheet, and two parallel, spaced-apart riser sidewalls extending from the riser floor to the downfall sheet.

7. An apparatus for use in conjunction with a conventional cotton harvester for gleaning cotton missed by the harvester comprising a pair of parallel, opposed, intake manifolds, each manifold comprising:

a floor member having a front edge, a rear edge, an outside edge, and a running edge, the running edge of each floor member being in spaced adjacent relationship with the running edge of the floor member of the parallel, opposed, intake manifold, a frontward end wall and a rearward end wall fixed to the floor member at the front edge and rear edge respectively, an outside wall fixed to the outside edge of the floor member and to the frontward and rearward end walls, an inside wall having a height significantly less than the outside wall, fixed to the frontward and rearward end walls and fixed to the floor member parallel to, but some distance from, the running edge of the floor member, a downfall sheet fixed to the frontward and rearward end walls, the top edge of the outside wall and the inside wall so as to be spaced from and inclined with respect to the floor member, the downfall sheets of the pair of parallel, opposed, intake manifolds thus forming a generally V-shaped trough, the inside wall of each manifold further comprising a plurality of apertures, each aperture opening into a forwardly- and upwardly-inclined duct leading to a flue inside the intake manifold.

8. The apparatus of claim 7 wherein the rearward end wall of each manifold further comprises an opening for discharging cotton collected by the intake manifold.

9. The apparatus of claim 8 further comprising blower means mounted on the cotton harvester and flexible conduits attached to the openings in the rearward end walls of each manifold and to the blower for withdrawing cotton collected by the intake manifolds.

10. The apparatus of claim 9 further comprising a conveyor means attached to the blower means for conveying the cotton collected to a cotton picker-header of the cotton harvester.

11. The apparatus of claim 10 wherein the conveyor means further comprises a debris eliminator comprising a longitudinal open framework, mounting means pivotally mounting the open framework with respect to the cotton harvester, wire screening fixed to the longitudinal open framework to define a passageway through which cotton can flow, and vibrating means fixed to the longitudinal framework for vibrating the debris eliminator.

12. The apparatus of claim 7 wherein the running edge of each floor member adjacent the front edge of the floor member includes a tapered leading edge for more easily receiving the stalk of a cotton plant and an angle member fixed to the floor member and extending above the floor member for assisting in preventing the cotton from coming in contact with the ground.

13. An apparatus for use in conjunction with a conventional cotton harvester for gleaning cotton missed by the harvester comprising a pair of parallel, opposed, intake manifolds, the pair of intake manifolds forming a generally V-shaped trough, the manifolds being fixed to the conventional cotton harvester and spaced from one another so as to receive the cotton plant between the two manifolds as it exits from the conventional cotton harvester, each manifold comprising a plurality of apertures opening from the floor of the V-shaped trough into a plurality of forwardly and upwardly inclined ducts leading to a flue inside the intake manifold, the flue of each manifold being further connected to means for withdrawing from the flue cotton collected by the intake manifolds.

14. The apparatus of claim 13 further comprising means for attaching each intake manifold to said conventional cotton harvester comprising a first plate fixed to a rear surface of the conventional cotton harvester, a second plate hingedly attached to said first plate by a hinge means for permitting the vertical displacement of the intake manifold, a rod member projecting normally from said second plate and adapted to be received into an aperture in a frontward end wall of the intake manifold.

15. The apparatus of claim 13 further comprising suspension means for suspending the intake manifold behind the conventional cotton harvester comprising a rod-like member pivotally mounted to the intake manifold, tension springs for elastically suspending the intake manifold and guide wires for restraining the motion of the intake manifold within prescribed limits.

* * * * *